United States Patent [19]

Von Arx

[11] Patent Number: 5,602,363
[45] Date of Patent: Feb. 11, 1997

[54] DIN RAIL MOUNTED ENCLOSURE

[75] Inventor: Theodore T. Von Arx, La Cresent, Minn.

[73] Assignee: Watlow/Winona, Inc., Winona, Minn.

[21] Appl. No.: 117,504

[22] Filed: Sep. 7, 1993

[51] Int. Cl.[6] .................................................. H02G 3/08
[52] U.S. Cl. ...................... 174/52.1; 439/532; 439/535; 439/716
[58] Field of Search ........................ 174/52.1, 50.5, 174/50.54, 52.5; 361/600, 748, 752; 439/527, 532, 535, 716, 718

[56] References Cited

U.S. PATENT DOCUMENTS

D. 353,365  12/1994  Marach ................................. D13/147
5,138,116   8/1992  Kabayama ......................... 174/52.1 X
5,192,227   3/1993  Bales ..................................... 439/532
5,221,811   6/1993  Seldin .................................. 174/52.1
5,318,462   6/1994  Oakley ................................. 439/716

*Primary Examiner*—Kristine L. Kincaid
*Assistant Examiner*—Christopher Horgan
*Attorney, Agent, or Firm*—Hugh D. Jaeger

[57] ABSTRACT

A DIN rail mounted enclosure for a relay, electronic control, sensing or other such similar device having a single lever for rapid one-handed engagement or disengagement with a DIN rail. A component housing cover secures readily to a base which includes lip or hook capturing members on its bottom surface for engagement of standard DIN rail. A circuit board structure is incorporated for the mounting of a face plate panel and control member.

20 Claims, 14 Drawing Sheets

DIN RAIL MOUNTED ENCLOSURE

BACKGROUND OF THE INVENTION

1. Field of the Invention

The present invention pertains to the control art, and more particularly, pertains to a DIN rail mounted enclosure for rapid mounting or dismounting of any contained circuitry or control device on a surface mounted DIN rail.

2. Description of the Prior Art

Prior art devices have been detachable, but often required the use of hand tools, such as screw drivers, wrenches or the like, to mount or dismount an enclosure to a standard mounting device, such as a DIN rail. If tools were not required, then certain snap lock devices were incorporated by the devices and generally were integral to the enclosure device and so mounted within the enclosure, then action of the release device was difficult at best and usually required the use of two hands to successfully mount, and especially to dismount, the enclosure device.

The present invention overcomes the difficulties of the prior art by incorporating a single, manually operable lever actuator to readily and single handedly mount or dismount the enclosure to a DIN rail or other suitable mounting surface.

SUMMARY OF THE INVENTION

The present invention, a DIN rail mounted enclosure, includes a minimum of major components including a base member for mounting of desired components and a cover member which secures over components secured to the base member. The base member includes lipped rail capturing hooks and a lever actuator for operation of a beveled lip about a living hinge for capture or release to or from a DIN mounting rail. The cover includes easy access wiring ports and slots for operation of wire clamping devices. A panel is also provided for adjustable control annunciator sources or the like.

According to one embodiment of the present invention, there is provided a DIN rail mounted enclosure having a walled base member which secures via a plurality of holes and other clamping support members or surfaces to a DIN rail. A lever on the bottom side of the base operates about a living hinge to position a beveled lip with respect to a DIN rail. Optional mounting brackets are also included for a non-DIN rail mounting. A cover having four sides and a removable panel secure with bayoneted tabs to the base member. The cover also includes flanking wire connection access ports and holes for access to the wire clamp devices by screw drivers or the like. Plugs are also provided for sealing off any portion of the wire connection access ports which are not used.

One significant aspect and feature of the present invention is a DIN rail mounted enclosure having onehanded quick mounting or dismounting capabilities.

Another significant aspect and feature of the present invention is a DIN rail mounted enclosure which does not require the use of tools for mounting or dismounting.

A further significant aspect and feature of the present invention is a cover having wire connection access ports and screw driver access ports or holes. An additional significant aspect and feature of the present invention is the use of a single lever actuator. Another significant aspect and feature of the 15 present invention is the use of an escutcheon plate to secure a control knob to a panel face.

A further significant aspect and feature of the present invention is the use of vertically aligned circuit boards to support a panel face.

Yet another significant aspect and feature of the present invention is the use of circuit boards to form a self-supporting and self-standing structure which is subsequently housed without further securation between a base member and a cover member.

Having thus described one embodiment of the present invention, it is the principal object hereof to provide a DIN rail mounted enclosure.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
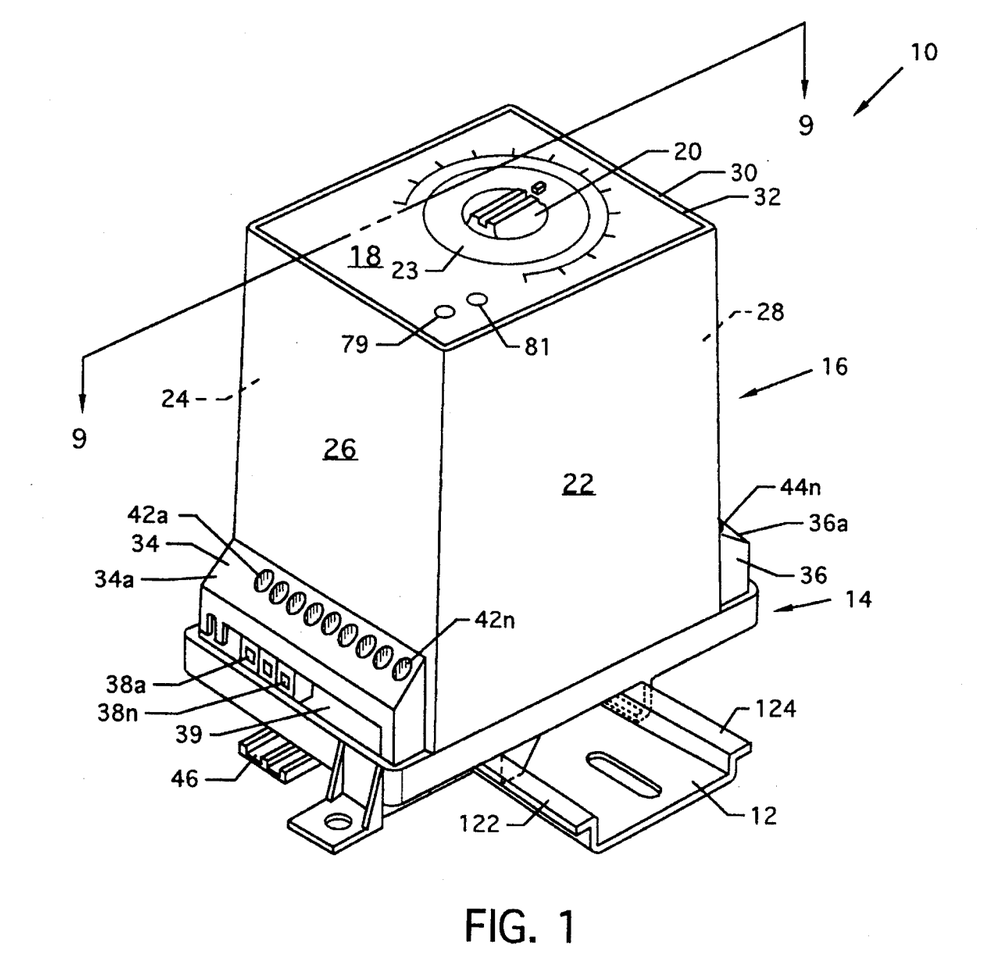
FIG. 1 illustrates a perspective view of the DIN rail mounted enclosure, the present invention.
Figure 2:
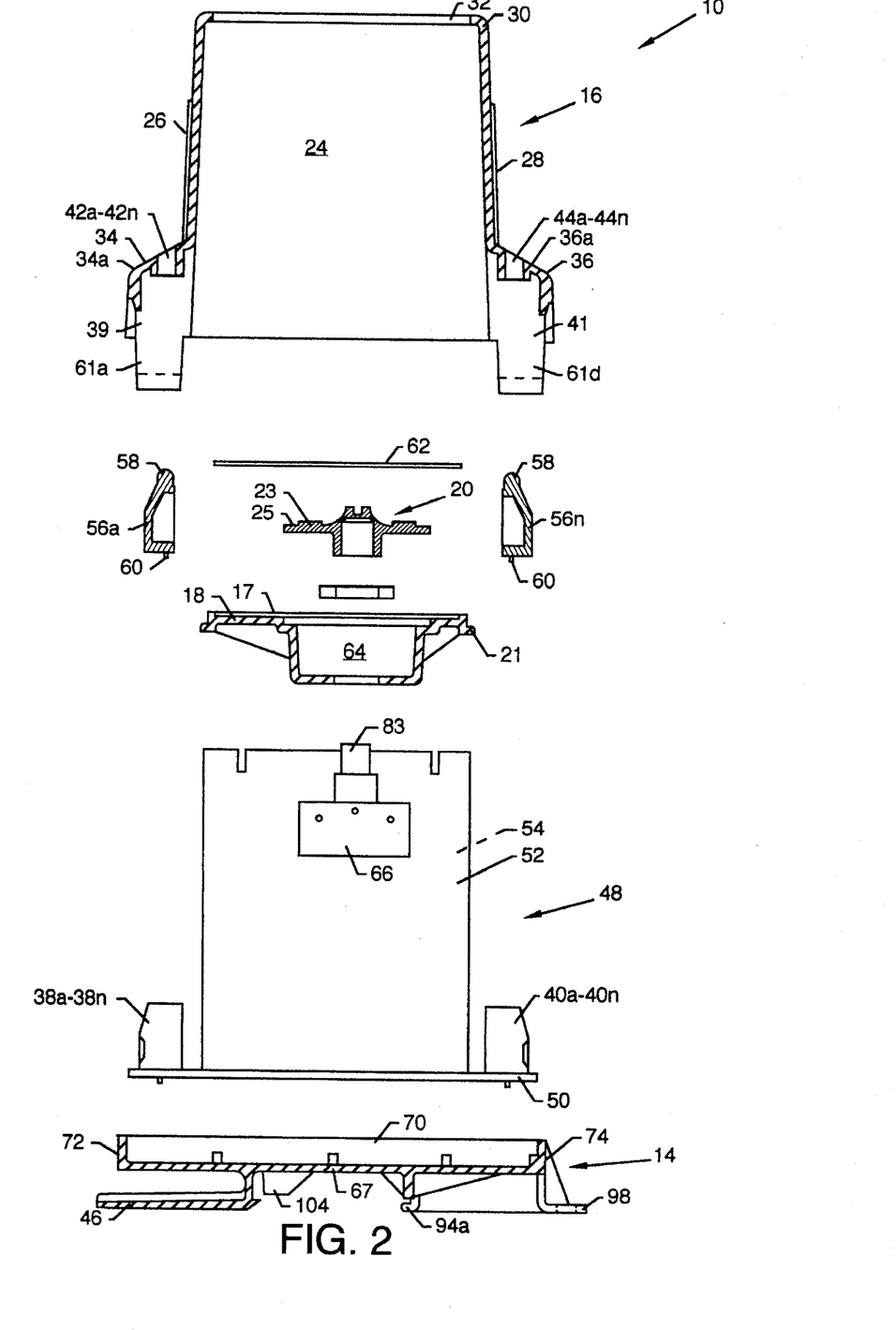
FIG. 2 illustrates an exploded view of the present invention.
Figure 3:
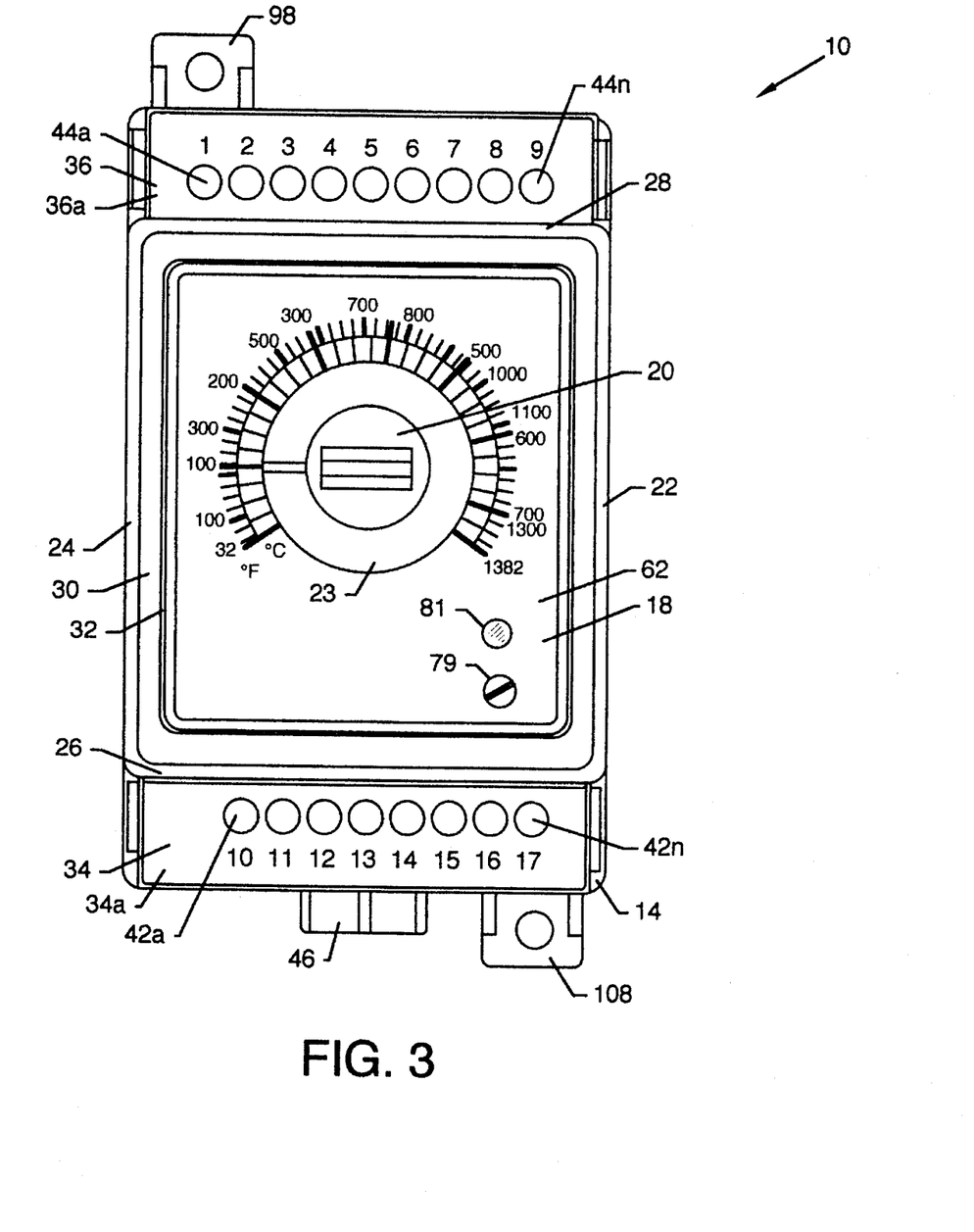
FIG. 3 illustrates a top view of the present invention.

FIG. 1 illustrates a perspective view of a DIN rail mounted enclosure 10, the present invention, engaging a DIN rail 12. The DIN rail mounted enclosure 510 and DIN rail 12 are illustrated in horizontal alignment, but can also be mounted in vertical alignment as desired and as described herein. The DIN rail mounted enclosure 10, constructed of suitable polycarbonate material such as Lexan, includes a rectangular base member 14, a cover 16 and a panel 18 for mounting of a temperature selector knob 20, or any other control or sensing device depending upon the nature of the components housed within the DIN rail mounted enclosure. The cover 16 includes opposing left and right side walls 22 and 24, and opposing bottom and to 26 and 28. An end wall 30 includes a rectangular opening 32 for accommodation of the panel 18. Angled lower and upper housings 34 and 36 extend from the bottom and top walls 26 and 28, and cover and encompass connector blocks such as blocks 38a–38n and 40a–40n, which are secured internally as later described. The angled housing include rectangular wire mounting ports 39 and 41 as illustrated in FIG. 2. A plurality of access holes 42a–42n and 44a–44n, such as for screw driver access to the connector blocks 38a–38n and 40a–40n are included in the angled walls 34a and 36a of the angled lower and upper housings 34 and 36, respectively, as illustrated in FIGS. 2 and 3. The base 14 snappingly accommodates the cover 16 and 30 electronic circuitry as described later in detail, and also includes a lever 46 for quick one-ha disengagement of the base 14, and thus, the end rail mounted enclosure 10 from the DIN rail 12.

Figure 6:
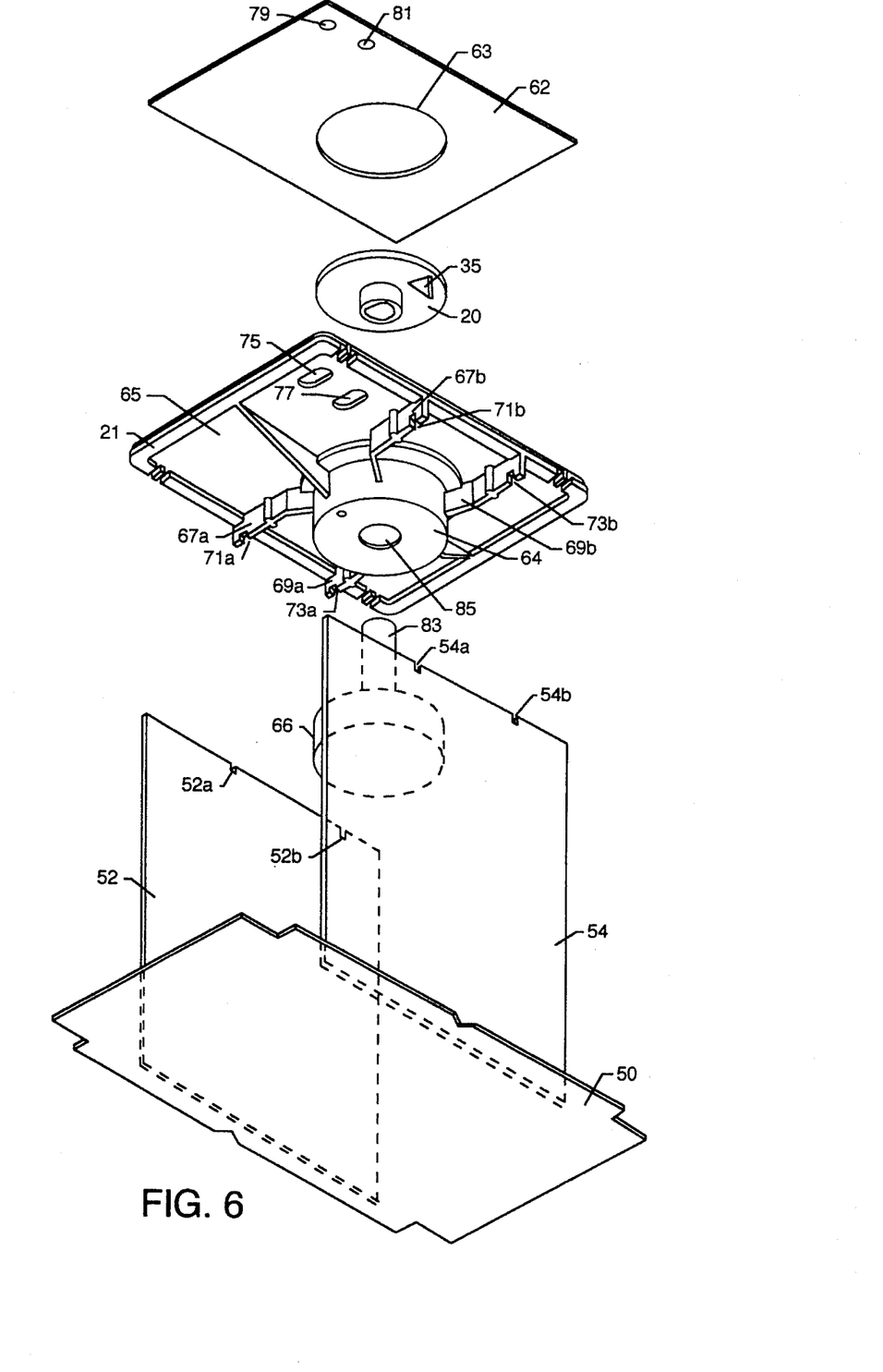
FIG. 6 illustrates an exploded view of the circuit board and panel member.

FIG. 2 illustrates an exploded view in section of the DIN rail mounted enclosure 10 numerals correspond to those element described or described in the FIG. 5 Illustrated in particular is a circuit 48 including a base circuit board 50, such as for a power supply and opposing notched circuit board 54 aligned at right angles to the main circuit also shown in FIG. 6. The notches of the opposing notched circuit boards 52 and 54 engage corresponding notched members in the panel 18 to form a sturdy boxlike structure as described later in detail. Connector blocks 38a–38n and 40a–40n secure to the base circuit board 50. Also illustrated are a plurality of connection plugs 56a–56n which align between the access hole's 42a–42n and 44a–44n of the angled housings 34 and 36 and the base circuit board 50 adjacent to the connector blocks 38a–38n and 40a–40n. The connection plugs 56a–56n have upper and lower protrusions 58 and 20 60, respectively. Upper protrusions 58 align with the lower portion of the access holes 42a–42n and 44a–44n, and the lower protrusions 60 protrude with holes in the base circuit board 50. An escutcheon plate 62 aligns and suitably secures to the top recessed surface 17 of 25 the panel 18, thus engaging the temperature selector knob therebetween. Included in the cover are a plurality of bayonet snap locks 61a–61n for engagement with rectangular holes in the base 14 as later described in detail. A formed cavity 64 beneath the panel 18 provides support for a control 66, wp rotated by the temperature selector knob 20.

FIG. 3 illustrates a top view of the DIN mounted enclosure 10 where all numerals correspond to those elements previously described or those described in the figures that follow. Although escutcheon plate 62 and temperature control illustrated, any other control and circuits used for controlling, sensing or otherwise alters other device contained within the DIN rail mounted enclosure 10.

Figure 4:
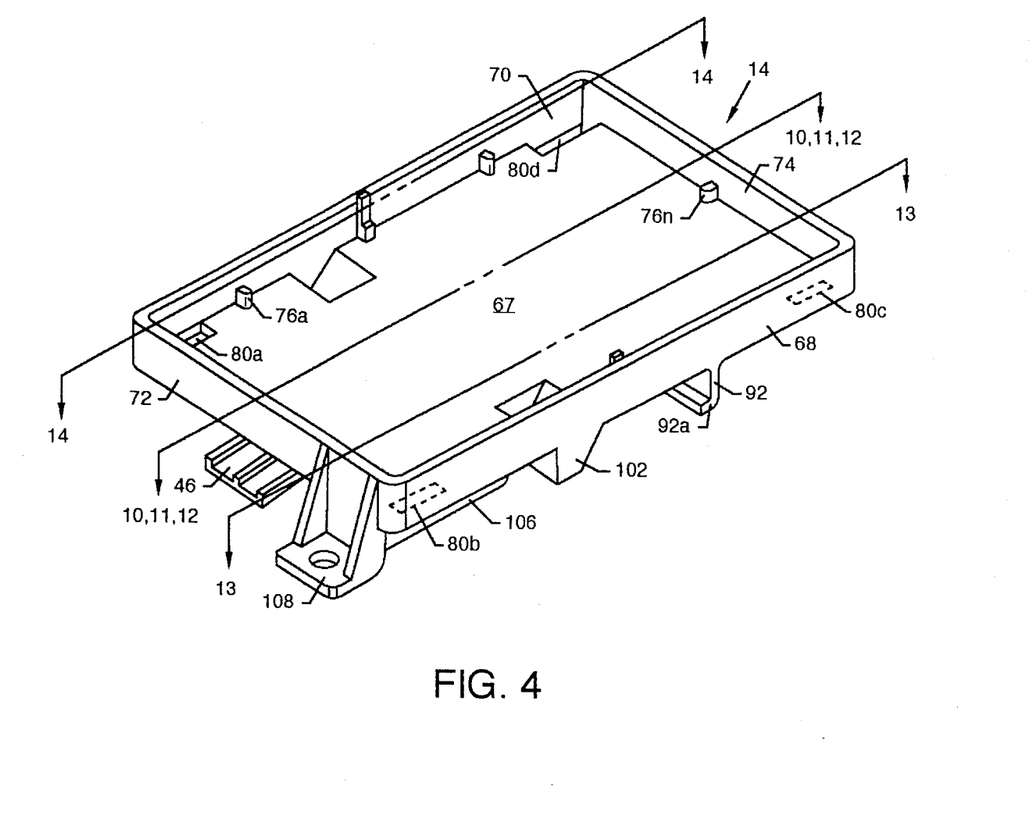
FIG. 4 illustrates a perspective view of the base.

FIG. 4 illustrates a perspective view of 14 where all numerals correspond to those previously described. The base 14, which accommodates the base circuit board 50, its associated members, the cover 16, is formed about a plana including, but not limited to, opposing side and 70 and opposing lower and upper walls 72 a-respectively. A plurality of circuit board supports 76a–76n extend from the planar member 67. Other members of the base are described in FIG. 8.

Figure 5:
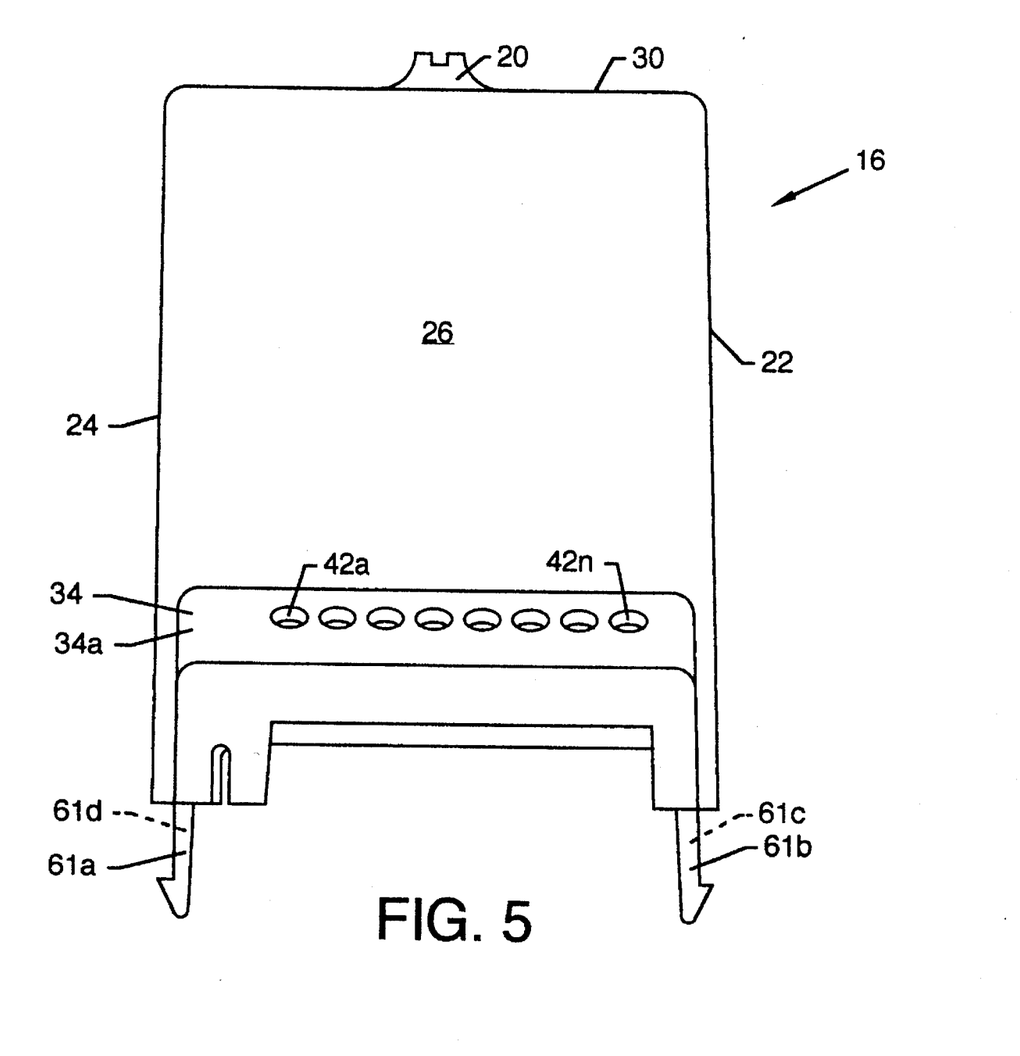
FIG. 5 illustrates a side view of the cover.

FIG. 5 illustrates a side view of the cover 16 where all numerals correspond to those elements previously described. Illustrated in particular are the bayonet snap locks 61a–61n for locking the cover 16 to the base 14.

Figure 7:
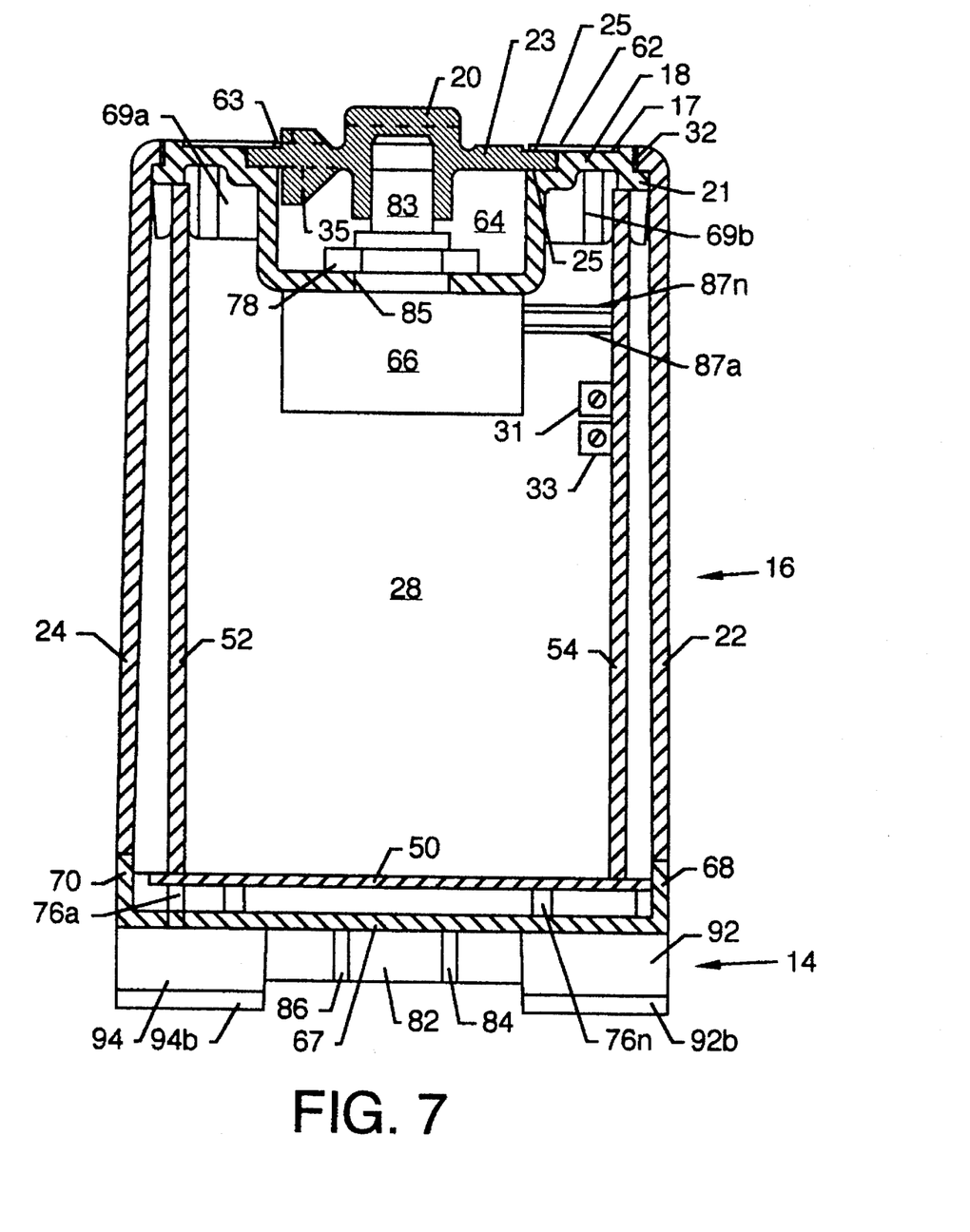
FIG. 7 illustrates a cross-sectional view of the cover in securement to the base.

FIG. 6 illustrates an exploded perspective view of the panel 18 and associated adjacent components where all numerals correspond to those elements previously described or those in the figures that follow. FIG. 7 illustrates the panel 18 in engagement with the combined circuit board assembly including circuit boards 50, 52 and 54. Circuit boards 52 and 54 secure opposing each other on and extended perpendicularly from the upper surface of the base circuit board 50.

Circuit board 52 includes notches 52a and 52b at its upper edge. Correspondingly, circuit board 54 includes notches 54a and 54b at its upper edge. Notches 52a, 52b, 54a and 54b engage corresponding notches in the panel 18 as described later in detail.

The panel 18 includes a cylindrical cavity member 64 extending from its planar lower surface 65. Also extending from the lower planar surface 65 are angled bracket members 67a, 67b, 79a and 69b having notches 71a, 71b, 73a and 73b, respectively. Notches 52a, 52b, 54a and 54b of circuit boards 52 and 54 engage notches 71a, 71b, 73a and 73b, respectively. Notches 52a, 52b, 54a and 54b of circuit boards 52 and 54 engage notches 71a, 71b, 73a and 73b of the panel 18, respectively, when the members are joined as illustrated in FIG. 7. Also included in the panel 18 are elongated holes 75 and 77 in alignment with adjustment hole 79 and lens 81 in the escutcheon plate 62.

The shaft 83 of control 66 aligns in hole 85 in the cavity structure 64 and is secured thereto by a nut as shown in the following figure.

FIG. 7 illustrates a cross-sectional view of the cover 16 in securement to the base 14 over circuit boards 50, 52 and 54. A plurality of slotted brackets 69a–69b extend from the underside surface 65 of the panel 18 to support the ends of circuit boards 52 and 54.

The potentiometer control 66 secures in the cavity by a nut 78 secured over the shaft 83 of the potentiometer control 66. A plurality of connector leads 87a–87n secure, such as by soldering, to the circuit board 54 anchoring the potentiometer control 66 and the secured panel 18 to the upper ends of the circuit boards 54 and 52 with assistance from the mutual notch engagement described previously. This complement of associated and mating circuit boards and panel 18 forms a sturdy self-supporting, self-standing structure which is first simply set into the rectangular base member 14 and which, secondly, is covered by the cover 16 whose bayonet snap locks 61a–61n of FIG. 5 snappingly engage the base member 14. A noncontinuous lip 21 about the perimeter of the panel 18 engages the rectangular opening 32 in the upper region of the cover 16.

Also illustrated in the figure is the engagement of the temperature selector knob 20 with the shaft 83 of the potentionmeter control 66. The temperature selector knob 20 includes a skirt 23 having an annular recess 25 about its outer circumference. The escutcheon plate 62 includes a hole 63 which accommodates an inner portion of the skirt 23. The escutcheon plate 62 secures to the recessed surface 17 of the cover 18 and overlaps the annular recess 25 on the skirt 23. This overlap slidingly engages the annular recess 25 of the skirt 23 and holds the temperature selector knob 20 against an annular shoulder 25 of the cylindrical cavity structure 64, thus ensuring capture of the temperature selector knob 20 within the panel 18. A stop 35 is included to limit the movement of the control potentiometer.

Also featured are trim potentiometers 31 and 33 which are adjusted to insure indexing of the temperature on the face of panel 18 with the actual temperature as controlled by the circuit board members.

MODE OF OPERATION

Figure 8:
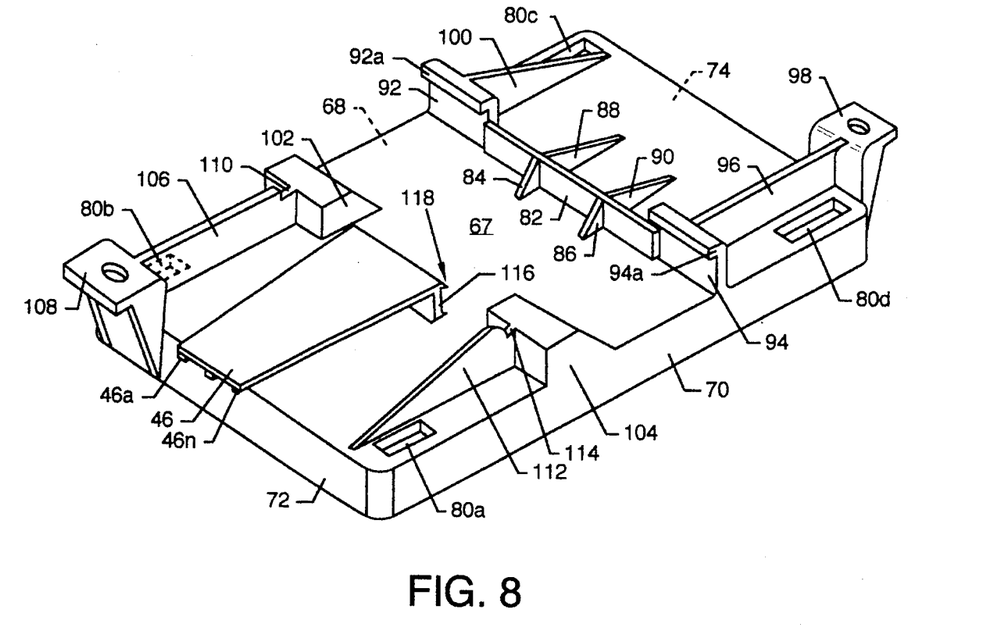
FIG. 8 illustrates a perspective view of an inverted base.

FIG. 8 illustrates a perspective view of inverted base 14 revealing the components to a DIN rail where all numerals correspond to those elements previously described or those that follow. Rectangular holes 80a–80d in surface 67 accommodate the bayonet snap locks described in previous figures.

Bracketing devices extend from the planar member 67 to facilitate mounting of the base 14 and its associated components to a DIN rail. A first set of devices is passive in nature and certain members of the second set of devices is active. The first passive set includes a support bar 82 extending perpendicularly from the planar member 67 and having filet supports 84, 86, 88 and 90. Flanking the support bar 82 are opposing and offset inverted L-brackets 92 and 94 extending perpendicularly from the planar surface 67 and having inwardly facing lips 92a and 94a, respectively. A support bar 96 extends perpendicularly from the planar member 67 and between the L-bracket 94 and an optional mounting bracket 98. A filet support 100 extends perpendicularly from the planar member 67 to support the L-bracket 92.

The active latch portion of the bracket device includes opposing support members 102 and 104. A support bar 106 extends perpendicularly from the planar member 67 and between the optional mounting bracket 108, and includes a support surface 110 adjacent to the support member 102. In a somewhat similar support bar 112 extends perpendicularly from the planar member 67 to intersect with the support member 104, and includes a support surface 114 adjacent to the support member 104. The lever 46 operates about a living or movable hinge formed by a hinge member 116 extending perpendicularly from the planar member 67. Vertical movement of the lever 46 about the hinge member positions a beveled locking lip 118. The lever includes support bars 46a–46n. Mounting brackets 98 and 108 are used for counting where no DIN available. The DIN rail 12 includes a planar flanked by lips 122 and 124. FIGS. 9–13 rate the securement of the DIN rail lips 122 and 124 base 14.

Figure 9:
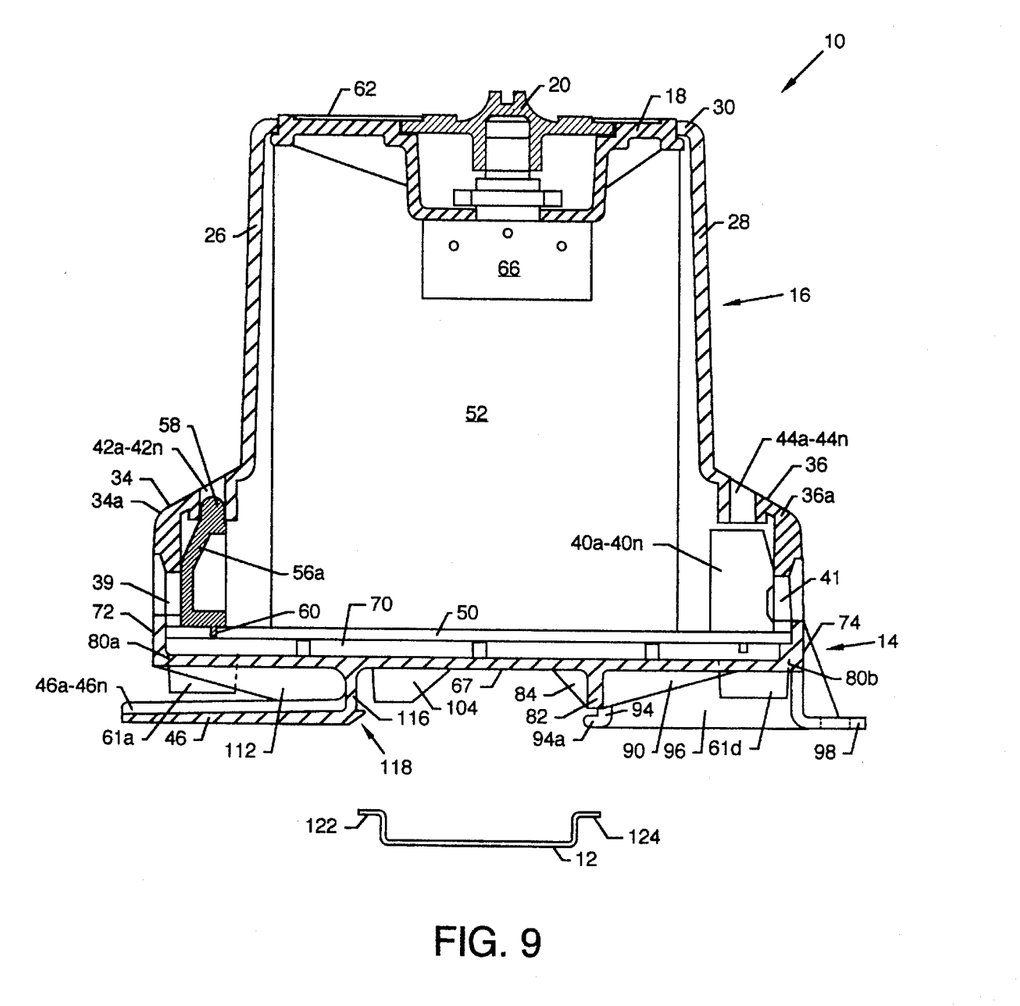
FIG. 9 illustrates a cross-sectional view of the assembled DIN rail mounted enclosure along line 9—9 of FIG. 1.

FIG. 9 illustrates a cross-sectional view along line 9—9 of FIG. 1 of the assembled DIN rail mounted enclosure 10 including the cover 16, various circuit boards and other components, and the base 14 prior to engagement with a DIN rail 12. All other numerals correspond to those elements previously described or those described in the figures that follow.

Figure 10:
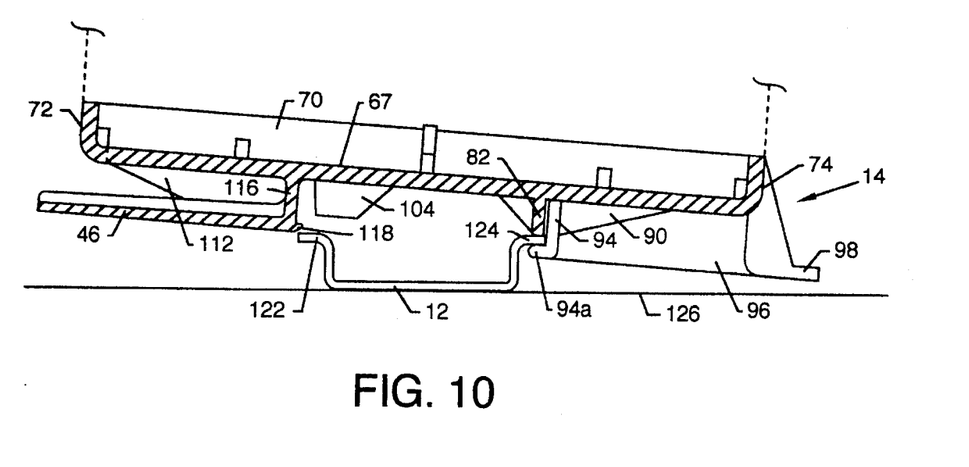
FIGS. 10, 11, and 12 illustrate cross-sectional views along lines 10—10, 11—11 and 12—12 of FIG. 4.
Figure 11:
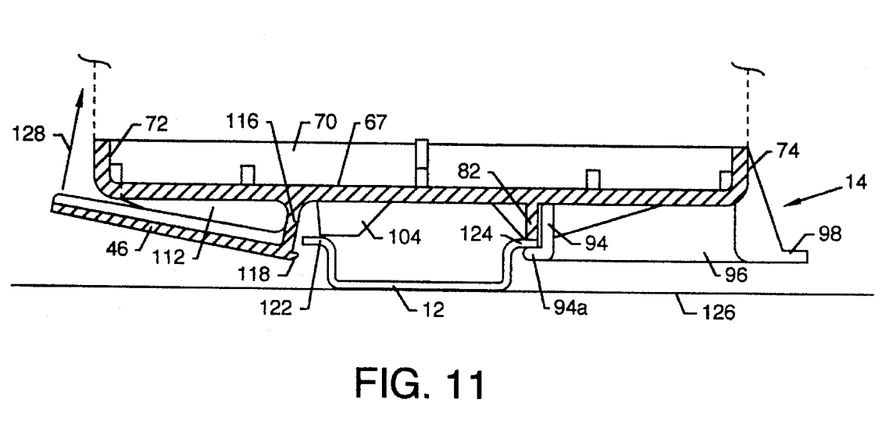
Figure 12:
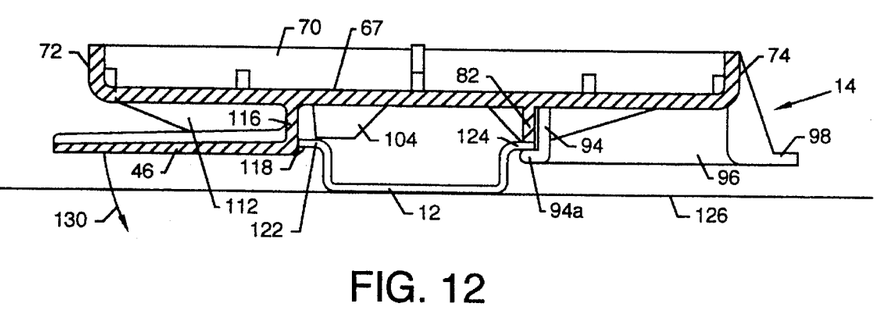

FIGS. 10–12 illustrate cross-sectional views along lines 10—10, 11—11, and 12—12 of FIG. 4 of the DIN rail mounted enclosure 10 showing the step for engaging of the DIN rail mounted enclosure 10 to the DIN rail 12. All other numerals correspond to those elements previously described or those described in the figures that follow. For purposes of clarity and brevity, only the base is shown in engagement with the DIN rail 12. The DIN rail 12 is secured to a surface 126. The first part of the engagement procedure is illustrated in FIG. The base 14 is maneuvered to engage the lip 124 of the DIN rail 12 between the lip 94a of the L-bracket 94, and with the lip 92a of the L-bracket 92 (not illustrated), and to also engage the support bar 82 which are otherwise illustrated in FIG. 8. Then, as likewise illustrated in FIG. 11, the lever 46 is actuated about the hinge member 116 towards the planar member 67 of the base 14 as indicated by arrow 128 to allow clearance by the beveled locking lip 118 in order 20 that the support member 104 may secure against the lip 122 of the DIN rail 12. Accommodation of the lip 122 is illustrated in detail in the figures that follow.

FIG. 12 illustrates the final engagement step where the lever 46 is allowed to return to its normal, passive, position as indicated by arrow 130, thus positioning the beveled locking lip 118 against the lip 122. The bevel on the locking lip 118 aids and assists in passage of the lip 122 beyond the locking lip 118 30 should the lever 46 not be fully depressed as described in FIG. 11. Disengagement of the DIN rail mounted enclosure 10 is accomplished by reversing the loading sequence.

Figure 13:
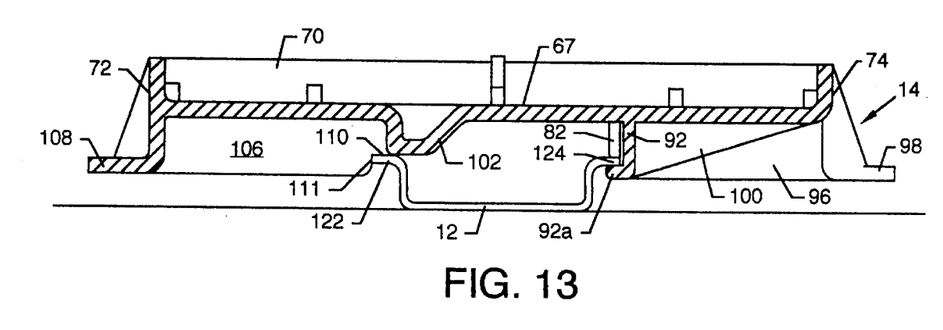
FIG. 13 illustrates a cross-sectional view of the base along line 13—13 of FIG. 4; and, FIG. 14 illustrates a cross-sectional view of the base along line 14—14 of FIG. 4.

FIG. 13, whose cross section is best defined by line 13—13 of FIG. 4, illustrates support and partial capture of the lip 122 by the support surface 110, and by adjacent support surface 111, both of which support surfaces are located on the support bar 106. Support and capture of the lip 124 is accomplished by capture of the lip 124 between the support bar 82 and the lip 92a of the L-bracket 92 as well as lip 94a of the L-bracket 94 as previously described. Full capture of the lip 122 is accomplished by the action of the lever 46 and the beveled locking lip 118 as previously described.

Figure 14:
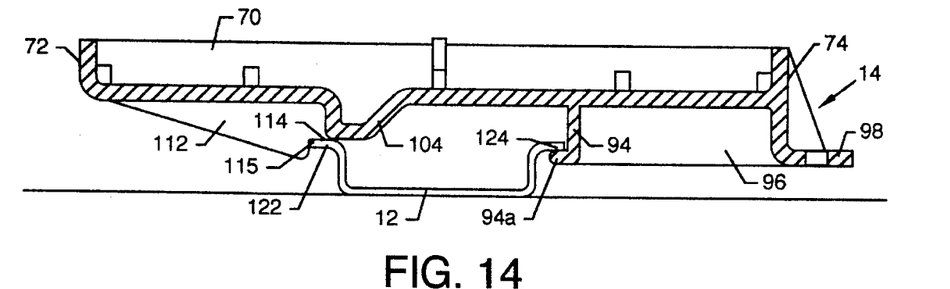

FIG. 14, whose cross section is best defined by line 14—14 of FIG. 4, illustrates support and partial capture of the lip 122 by the support surface 114, and by adjacent support surface 115, both of which are located on the support bar 112. Support and capture is also aided by support of the lip 122 of the DIN rail 12 with the support member 104.

Various modifications can be made to the present invention without departing from the apparent scope hereof.

We claim:

1. A DIN rail mounting device comprising,
   a. a rectangular, planar, base member having a first, passive bracketing device and a second, active, bracketing device extending from one side thereof;
   b. said first, passive, bracketing device including a first support bar extending perpendicularly from said planar base member;
   c. said first bracketing device further including first and second L-brackets bracketing said first support bar and having inwardly facing lips for engagement with the underside of a lip portion of DIN rail;
   d. said first support bar and said first and second L-brackets positioned to engage said lip portion of said DIN rail; and,
   e. said second, active, bracketing device including:
      1. a second support bar parallel to said first support bar and extending perpendicularly from said planar base member,
      2. a movable hinge member parallel to said second support bar and extending perpendicularly from said planar base member,
      3. a locking lip portion extending inwardly from said movable hinge member to engage the underside of the lip portion of said DIN rail while said hinge is in a surface position, and,
      4. a lever portion extending outwardly from said movable hinge member, whereby motion of said lever portion toward said planar base member causes said locking lip portion to move outwardly to disengage from said DIN rail and allow upward, rotational, motion of said planar base member, freeing said planar base member from said DIN rail.

2. The DIN rail mounting device according to claim 1 further including side walls extending upwardly from a surface of said planar base member opposite said first and second L-brackets.

3. The device according to claim 2 further including cover means abutting said side walls to provide an enclosure.

4. The device according to claim 3 further wherein said planar base member includes a plurality of apertures disposed about the periphery and said cover means includes a corresponding plurality of bayonet snap lock projections for engagement with said apertures to retain said cover means in engagement with said planar base member.

5. The device according of claim 4 wherein said planar base member is fabricated of polycarbonate material.

6. The device according to claim 1 wherein said locking lip portion includes a beveled surface opposite said locking lip portion engaging the underside of the lip portion of said DIN rail whereby said movable hinge is moved outwardly by engagement with the DIN rail during a mounting operation.

7. The device according to claim 6 wherein said beveled surface moves said movable hinge outwardly a distance sufficient to allow the DIN rail lip portion to pass between said bracketing device lips and to allow said base member support bars to be seated against said DIN rail by the application of force moving said planar base member toward said DIN rail.

8. The device according to claim 5 wherein said planar base member includes a plurality of printed circuit board supports about the periphery.

9. The device according to claim 8 wherein said cover means encloses a printed circuit board containing electronic components.

10. The device according to claim 9 wherein said cover means encloses and retains said printed circuit board.

11. A DIN rail mounting device comprising,
   a. a planar, base member having a first, passive bracketing device and a second, active, bracketing device extending from one side thereof;
   b. said first, passive, bracketing device including a first support bar extending perpendicularly from said planar base member;
   c. said first bracketing device further including first and second L-brackets bracketing said first support bar and having inwardly facing lips for engagement with the underside of a lip portion of a DIN rail;
   d. said first support bar and said first and second L-brackets positioned to engage said lip portion of said DIN rail; and,
   e. said second, active, bracketing device including:
      1. a second support bar parallel to said first support bar and extending perpendicularly from said planar base member,
      2. a movable hinge member parallel to said second support bar and extending perpendicularly from said planar base member,
      3. a locking lip portion extending inwardly from said movable hinge member to engage the underside of the lip portion of said DIN rail while said hinge is in a passive position, and,
      4. a lever portion extending outwardly from said movable hinge member, whereby motion of said lever portion toward said planar base member causes said locking lip portion to move outwardly to disengage from said DIN rail and allow upward, rotational, motion of said planar base member, freeing said planar base member from said DIN rail.

12. The DIN rail mounting device according to claim 11 further including side walls extending upwardly from the surface of said planar base member opposite said first and second L-brackets.

13. The device according to claim 12 further including cover means abutting said side walls to provide an enclosure.

14. The device according to claim 13 wherein said planar base member includes a plurality of apertures disposed about the periphery thereof and said cover means includes a corresponding plurality of bayonet snap lock projections for engagement with said apertures to retain said cover in engagement with said planar base member.

15. The device according to claim 14 wherein said planar base member is fabricated of polycarbonate material.

16. The device according to claim 11 wherein said locking lip portion includes a beveled surface opposite said locking lip portion engaging the underside of the lip portion of said DIN rail whereby said movable hinge is moved outwardly by engagement with the DIN rail during a mounting operation.

17. The device according to claim 16 wherein said beveled surface moves said movable hinge outwardly a distance sufficient to allow the DIN rail lip portion to pass between said bracketing device lips and to allow said base member support bars to be seated against said DIN rail by the application for force moving said planar base member toward said DIN rail.

18. The device according to claim 15 wherein said planar base member includes a plurality of printed circuit board supports about the periphery.

19. THe device according to claim 18 wherein said cover means encloses a printed circuit board containing electronic components.

20. The device according to claim 19 wherein said cover means encloses and retains said printed circuit board.

\* \* \* \* \*